Jan. 8, 1952 — B. E. O'HAGAN ET AL — 2,581,552
RAILWAY TRAIN DESCRIBER
Filed Sept. 6, 1946 — 7 Sheets-Sheet 1

INVENTORS
Bernard E. O'Hagan, deceased,
by Clare O'Hagan, administratrix,
and Paul N. Martin.
BY

THEIR ATTORNEY

Fig. 3.

INVENTORS.
Bernard E. O'Hagan, deceased
by Clare O'Hagan, administratrix,
and Paul N. Martin.

THEIR ATTORNEY

Fig. 4.

Jan. 8, 1952 B. E. O'HAGAN ET AL 2,581,552
RAILWAY TRAIN DESCRIBER
Filed Sept. 6, 1946 7 Sheets-Sheet 4

Fig. 5.

INVENTORS.
Bernard E. O'Hagan, deceased,
Clare O'Hagan, administratrix,
and Paul N. Martin.
BY
THEIR ATTORNEY

INVENTORS.
Bernard E. O'Hagan, deceased, by
Clare O'Hagan, administratrix,
and Paul N. Martin.
BY

THEIR ATTORNEY

Jan. 8, 1952  B. E. O'HAGAN ET AL  2,581,552
RAILWAY TRAIN DESCRIBER
Filed Sept. 6, 1946  7 Sheets-Sheet 7

INVENTORS
Bernard E. O'Hagan, deceased, by
Clare O'Hagan, administratrix,
and Paul N. Martin.
BY
THEIR ATTORNEY Patented Jan. 8, 1952

2,581,552

UNITED STATES PATENT OFFICE 2,581,552

RAILWAY TRAIN DESCRIBER

Bernard E. O'Hagan, deceased, late of Swissvale, Pa., by Clare O'Hagan, administratrix, Swissvale, Pa., and Paul N. Martin, Penn Township, Allegheny County, Pa., assignors to Westinghouse Air Brake Company, a corporation of Pennsylvania Application September 6, 1946, Serial No. 695,204

8 Claims. (Cl. 246—2)

The present invention relates to railway train describers and more particularly to such apparatus to indicate the destination of trains.

On subways and similar railway systems where the trains are operated closely following each other, delays may occur at interlockings and junction points because of the wayside operator waiting to make sure of the destination of the approaching train before lining up the route.

Accordingly, a feature of the present invention is the provision of improved train describers to indicate the destinations of trains.

Another feature of the invention is the provision of train describer apparatus incorporating novel radiant energy transmitting and receiving means capable of responding differently for each of a plurality of different train destinations.

Another feature of the invention is the provision of light transmitting and phototube receiving apparatus located partly on a train and partly at a wayside point to establish different destination indications corresponding to predetermined variations of the train carried part of the apparatus.

Again, a feature of the invention is the provision in apparatus of the type here involved of improved train identification markers.

Other features, objects and advantages of the invention will appear as the specification progresses.

To attain the foregoing features, objects and advantages of the present invention, there are provided novel train identification markers which are adaptable of being differently conditioned for each one of a plurality of destinations to which a train may be dispatched, there being an individual condition of the marker means for each destination. The train identification means cooperates with wayside apparatus through the use of radiant energy preferably in the form of light beams to establish a control condition of the wayside apparatus which corresponds to a predetermined pattern or characteristic of the waves of the radiant energy. The wayside apparatus is selectively controlled to different conditions for the different patterns or characteristics of the energy waves, there being an individual condition of the wayside apparatus for each pattern or characteristic. The wayside apparatus is adapted to electrically control an indication means to establish individual indications of the different conditions, that is, a different indication for each of the train destinations. The radiant energy means is located in the approach to the interlocking or junction point leading to the different destinations and the indication means is made visual or audible, or both, and is located at a tower from which an operator sets up the different routes, such indication enabling the operator to line up the proper route for an approaching train before the train arrives at the junction point. The radiant energy waves are preferably in the form of light beams and the wayside apparatus responsive thereto includes photoelectric cells or tubes responsive to such light beams.

There shall be described several forms of apparatus embodying the invention and then there shall be pointed out the novel features thereof in claims.

In the accompanying drawings.

In each of the different views, like reference characters are used to designate similar parts.

Figure 1:
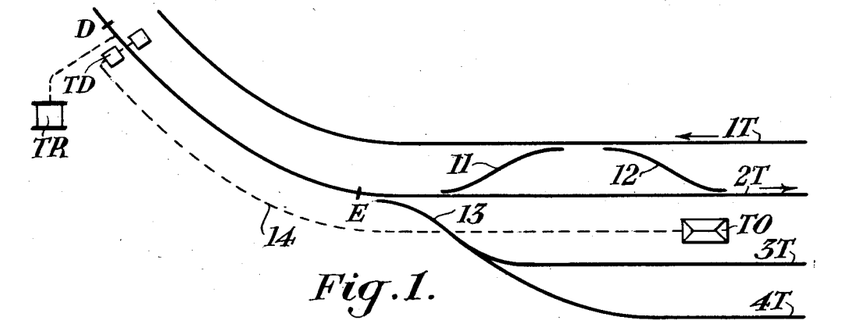
Fig. 1 is a diagrammatic view showing a track layout of a junction point or interlocking at which the train describer of the invention may be used.

Referring to Fig. 1, the reference characters IT and 2T designate the tracks of a double track railway over which traffic normally moves in the direction indicated by arrows. The tracks IT and 2T are provided with crossovers II and I2 and track 2T is further provided with a turnout I3 leading to tracks 3T and 4T. The track switches of the crossovers and of the turnout are preferably included in an interlocking, the control machine of which is located in a tower TO. In the usual manner wayside signals would also be included in the interlocking to govern traffic over the several track routes in which this track layout can be arranged. The power operating switch machines and signals governed by the interlocking are not shown for the sake of simplicity because they are not required for a full understanding of this invention. It is sufficient for the present application to point out that the operator at the tower TO can form and arrange the track switches into any one of several routes and furthermore there are some five possible routes which a train approaching on the track 2T may take. As illustrated in the drawing, the tracks 1T and 2T are on a curve and thus the operator at the tower TO would have only a limited view of a train approaching on track 2T.

It is to be understood that the invention is not limited to the track layout here illustrated and it can be used with other track arrangements. As an aid to the understanding of the train describer embodying the invention, it shall be assumed that the track layout of Fig. 1 is a portion of a subway and the trains are made up of multiple unit cars, the train operator being located in the cab of the leading car.

The track 2T is formed with an approach track section D—E which is provided with a track circuit of the usual form, and which includes a track relay TR connected across the rails at the entrance end D of the section. This track section may be of any suitable length and at some intermediate point of the section there is located wayside apparatus for a train describer embodying this invention, such wayside apparatus being indicated conventionally in Fig. 1 at TD. Such wayside apparatus will have circuits extending to the tower TO as indicated by a dotted line 14. The wayside apparatus together with the circuits will be described more fully hereinafter.

Figure 2A:
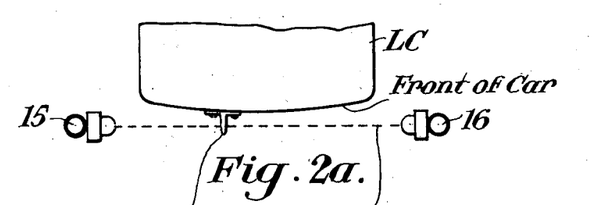
Figs. 2a and 2b are top and front views, respectively, showing one form of train identification means embodying the invention.
Figure 2B:
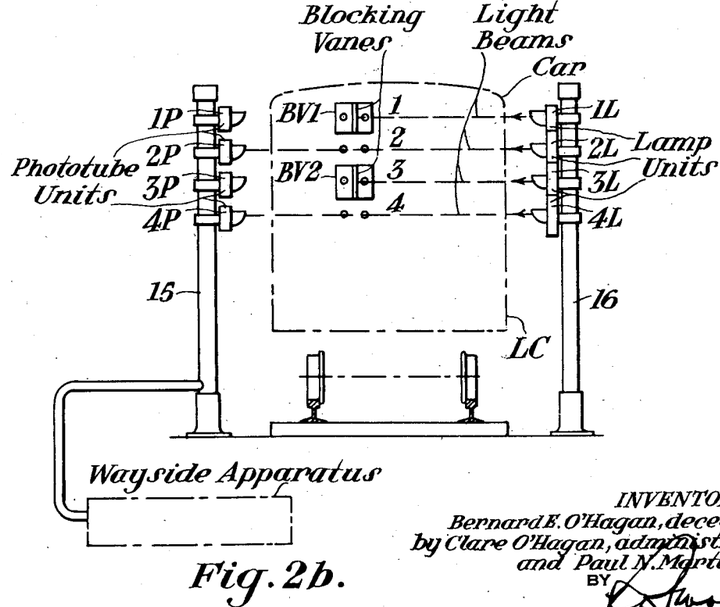

In Figs. 2a and 2b the reference character LC indicates the leading car of a train. The front end of this car LC is equipped with train identification marker means in the form of light blocking vanes, two vanes BV1 and BV2 being shown. Each of these light blocking vanes is of opaque material, such as sheet steel. Each vane would be of a suitable dimension, such as of the order of two feet square. Each vane is provided with slotted holes to slip over pins secured to the front of the car so that each vane can be easily and quickly mounted in place or removed, and when in place the vane extends in front of the car. The car is provided with different sets of pins for mounting a plurality of vanes, the arrangement here used permitting vanes to be mounted in four different positions, and which positions are identified by the numerals 1, 2, 3 and 4. These four positions are preferably in a vertical plane at preselected heights above the top of the track rails, and they would of course be mounted in front of the car in a position to not interfere with the view of the train operator. Thus these blocking vanes by their positions can be made to serve as route or destination markers. That is, vanes BV1 and BV2 mounted at positions 1 and 3 would identify the train as having a first destination, and vanes mounted at the positions 1 and 2, 3 and 4 and so on, would identify the trains for other destinations. Using four different positions and two vanes for each destination there are six different identifications that can be obtained. It is clear that by using other arrangements other additional identifications can be provided for the train. A train upon leaving its terminal will have blocking vanes placed in the positions corresponding to the destination of the train. It is apparent that in place of having the blocking vanes removable the vanes can be hinged and certain ones turned down flat against the front of the car leaving the remaining vanes extending in front of the car to indicate the destination.

Light beams directed across the track at right angles to the rails and at the heights above the track rails corresponding to the heights of the blocking vanes will be intercepted according to the position at which the vanes are mounted, each vane intercepting the corresponding beam a fraction of a second before all the beams are intercepted by the body of the car.

The trackway portion of the train destination identification means shown in Figs. 2a and 2b includes a light emitting means and a light responsive means. Two masts 15 and 16 are mounted on opposite sides of the trackway at points directly across from each other. The mast 16 carries four lamp units 1L, 2L, 3L and 4L, and the mast 15 carries four phototube units 1P, 2P, 3P and 4P. Each lamp unit includes a source of light, such as an incandescent lamp and a lens arranged to direct a narrow light beam across the track at right angles to the track rails. Each phototube unit includes a photoelectric cell preferably of the emissive type which when exposed to a light beam produces emission of electrons so that the tube becomes conductive. The lamp units are positioned for the four light beams indicated in Fig. 2b by dotted lines, to be at heights above the rails corresponding to the positions of the light blocking vanes carried by the car. Likewise, the phototube units are mounted at corresponding heights for each light beam to fall upon an individual one of the phototube units. It follows that when no car is present each phototube is exposed to the corresponding beam and is conductive, but that when a car approaches the location of the wayside apparatus so that the beam is intercepted, the phototube unit becomes non-conductive. The light beams corresponding to the positions at which the light blocking vanes are mounted on the car will be intercepted a fraction of a second before the remaining beams are intercepted by the body of the car. This arrangement of intercepting the light beam and influencing the corresponding phototube is used to establish different control conditions of the corresponding wayside apparatus.

Figure 3:
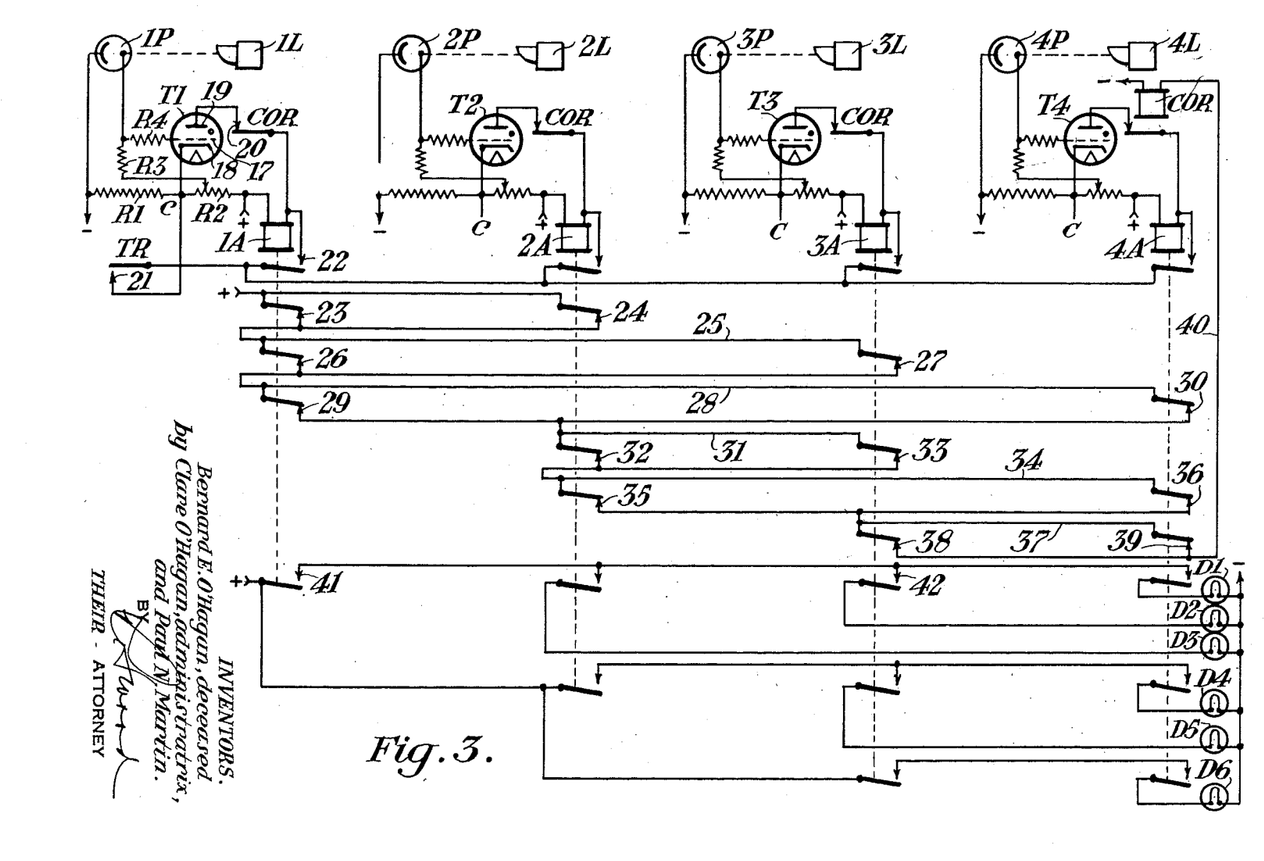
Figs. 3, 4, 5 and 6 are diagrammatic view showing different forms of wayside receiving and indicating apparatus for use with the train identification means of Figs. 2a and 2b, and each of which form of wayside apparatus embodies the invention.

In Fig. 3, there is disclosed wayside apparatus responsive to the phototube units to establish different control conditions according to the arrangement at which the light beams are intercepted. Each lamp unit and its associated phototube are associated with a control unit including an amplifier tube and a control relay. For example, lamp unit 1L and its associated phototube 1P are associated with a control unit including an amplifier tube T1 and a control relay 1A. The tube T1 may be any one of several different types and is shown as a hot cathode, grid control gas filled tube. The phototube and tube T1 are powered from a suitable source here shown as a voltage divider comprising two resistors R1 and R2 connected in series across the positive and negative terminals indicated by the plus and minus signs of a direct circuit source such as a battery not shown, the junction terminal of the resistors R1 and R2 being indicated as a mid terminal C. The voltage derived from resistor R2 of the voltage divider is applied across anode 19 and cathode 18 of the tube T1 through the winding of control relay 1A and a front contact 20 of a relay COR to be referred to later.

Certain contact members of relay COR and other relays to be referred to later are shown in the drawings remote from the winding of the relay for the sake of simplicity. Each such contact member is identified by the reference character of the associated relay.

Tube 1P is connected across a preselected portion of the voltage divider through a resistor R3 and is connected to a control grid 17 of tube T1 through a resistor R4. When the light beam from lamp 1L falls upon the phototube 1P, the tube 1P is maintained conductive and the current flowing through resistor R3 due to the voltage derived from the voltage divider and the conductive condition of the tube 1P creates a voltage drop across resistor R3 that is applied to control grid 17 of tube T1 and maintains the grid 17 sufficiently negative in potential with respect to cathode 18 to prevent ionization of the tube T1 by the voltage applied to its anode circuit.

When the light beam from lamp 1L is intercepted the phototube 1P becomes non-conductive and the bias voltage on the grid 17 of the tube T1 is driven in the positive direction and tube T1 is ionized with the result the control relay 1A is picked up by the conduction current of tube T1. With relay 1A picked up by the conduction current of tube T1, the relay is retained energized by a stick circuit including its own front contact 22 and a back contact 21 of track relay TR, it being recalled that the track relay TR is shunted by the train entering the section D—E, so that the back contact 21 is closed some time prior to the interception of the light beam from the lamp 1L.

The remaining lamp units and associated phototubes of Fig. 3 each govern a control unit including a control relay and an amplifier tube in the same manner as just described in connection with lamp 1L and phototube 1P controlling the control unit including tube T1 and relay 1A. It is pointed out that each control relay 2A, 3A and 4A is provided with a pick-up circuit which includes the associated amplifier tube and a front contact of relay COR, and with a stick circuit which includes a front contact of the relay and back contact 21 of the track relay TR. It is also to be pointed out that a common battery or power source is connected across the voltage dividers of the several control units.

A relay COR serves to check the released position of the control relays and to avoid the picking up of any control relay when the light beams are intercepted by the body of the car. Relay COR is energized through a circuit network governed by back contacts of the control relays with the relays arranged in combinations of two relays each. This circuit network can be traced from the positive terminal of the power source through back contacts 23 and 24 in parallel of relays 1A and 2A, respectively, wire 25, back contacts 26 and 27 in parallel of relays 1A and 3A, respectively, wire 28, back contacts 29 and 30 of relays 1A and 4A, respectively, wire 31, back contacts 32 and 33 in parallel of relays 2A and 3A, respectively, wire 34, back contacts 35 and 36 in parallel of relays 2A and 4A, respectively, wire 37, back contacts 38 and 39 in parallel of relays 3A and 4A, respectively, wire 40 and winding of relay COR to the negative terminal of the power source. With relay COR picked up closing its front contacts the anode circuits of the amplifier tubes are closed. When any combination of two control relays are picked up simultaneously, the relay COR is deenergized and released to open the anode circuits of the remaining tubes. Thus with the blocking vanes BV1 and BV2 placed at positions 1 and 3, the relays 1A and 3A will be picked up when the train advances for the blocking vanes to intercept the corresponding light beams, and with relays 1A and 3A picked up, the relay COR is released so that relays 2A and 4A cannot respond to the interception of the associated light beams by the car body. It is to be noted that the relay COR is of the quick-acting type adapted to release in the fraction of a second the blocking vanes intercept the light beams ahead of the body of the car when a train is moving at a relatively high speed. The relay COR on picking up also interrupts the anode circuits of the amplifier tubes that were made conductive and each of these tubes is restored to its deionized condition. The control relays picked up are retained picked up through their stick circuits until the train vacates the track section and the track relay TR is reenergized opening back contact 21.

The control relays are used to selectively govern an indication means according to the control relays picked up. An indication means comprising an indicator having destination lamps D1 to D6, inclusive, is located at the tower TO and the lamps are controlled through a circuit network that requires a combination of two relays to be picked up to complete a lamp circuit. For example, with relays 1A and 3A picked up closing front contacts 41 and 42, a circuit is completed for destination lamp D2. Similarly, each combination of two control relays when energized completes a circuit for a preselected destination lamp, as will be readily understood by an inspection of Fig. 3.

To sum up, the light blocking vanes of the car intercept light beams to govern control relays which in turn establish a destination indication corresponding to the positions of the vanes so that the operator can set up the proper route for the approaching train.

Figure 4:
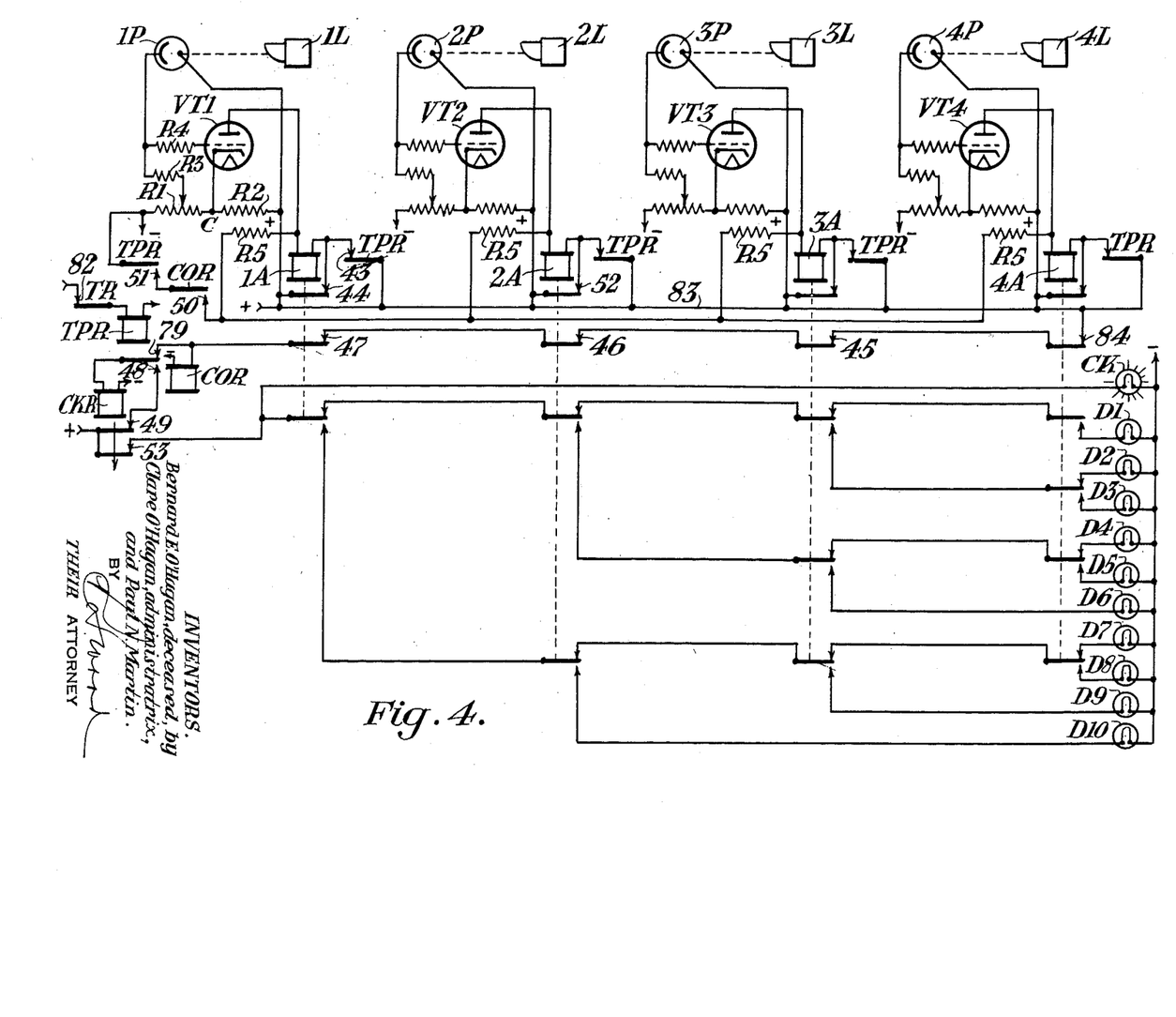

In Fig. 4 there is disclosed another form of wayside apparatus that can be controlled by the phototubes to establish different destination indications. In Fig. 4, the amplifier tubes VT1 to VT4, inclusive, are of a high vacuum type and the control relays are energized under normal conditions, that is, when no train is present. Looking at the lamp unit 1L and at its associated phototube 1P of Fig. 4, the phototube 1P is powered by a voltage drop between the positive terminal of the voltage divider and a preselected portion of resistor R1 of the voltage divider. With the light beam falling on the phototube 1P to make it conductive, the conduction current creates a voltage drop across resistor R3 and the parts are so proportioned that the voltage drop across resistor R3 overbalances the bias voltage of tube VT1 derived from resistor R1 and the tube VT1 is conditioned for the anode circuit current to energize the control relay 1A, the circuit for relay 1A extending from the positive terminal of the voltage divider over its own front contact 44 in multiple with front contact 43 of a track repeater relay TPR and the anode to cathode space of the tube VT1 to the mid terminal C of the voltage divider. Repeater relay TPR is controlled by an obvious circuit including front contact 82 of track relay TR. In like manner, each of the remaining control relays 2A, 3A and 4A is controlled by the associated lamp unit and phototube and a description of this portion of the apparatus need not be repeated. In Fig. 4, the relay COR and another check relay CKR in multiple are energized through a circuit that includes in series a front contact of each of the control relays, this circuit extending from the positive terminal of the power source through wire 83, front contacts 84, 45, 46 and 47 of relays 4A, 3A, 2A and 1A, respectively, and winding of relays COR and CKR in multiple to the negative terminal of the power source. It is to be noted that a front contact 79 of the repeater relay TPR is interposed in the connection to the check relay CKR.

When a train enters the approach section D—E to shunt the track relay TR, the repeater relay TPR is released prior to the interception of any of the light beams by the train carried blocking vanes. Assuming a blocking vane is placed at position 1 to intercept the light beam of lamp unit 1L, the tube 1P becomes non-conductive and the bias of tube VT1 swings in the negative direction due to the bias voltage derived from the resistor R1 of the voltage divider with the result that the anode circuit current of the amplifier tube VT1 is so decreased the control relay 1A is released. When relay 1A has once released, it then remains released due to the opening of its stick contact 44 until it is reenergized by the closing of the front contact 43 of track repeater relay TPR when the train vacates the section. With the control relay 1A released, the circuit for relays COR and CKR is open at front contact 47 of relay 1A and relay COR is quickly released but the check relay CKR is retained energized by a stick circuit including back contact 48 of relay TPR and front contact 49 of the relay CKR.

On the assumption that blocking vane BV2 is in position 3 on the car to intercept the light beam from lamp unit 3L at the same time the beam from lamp unit 1L is intercepted by the vane BV1, then the relay 3A is released at the same time as the control relay 1A. With relay COR released in the manner explained above to close back contact 50, the remaining control relays 2A and 4A are retained picked up over respective stick circuits when the light beams are intercepted by the car body.

Looking at relay 2A, for example, current flows from the positive terminal of the current source through front contact 52 and winding of the control relay 2A, a resistor R5, back contact 50 of relay COR and back contact 51 of relay TPR to the negative terminal of the power source. Thus it follows that only control relays corresponding to the positions of the blocking vanes on the approaching train are released.

In Fig. 4, the tower indication means is provided with ten destination lamps and a check lamp CK. The check lamp CK is controlled over front contact 53 of the check relay CKR and is illuminated at all times except in case of a circuit failure occurring that will deenergize one of the control relays without the corresponding light beam being intercepted. The ten destination lights are obtained by using a single control relay to select certain ones of the destination lamps as well as a combination of two control relays to select a lamp. That is, certain train destinations are identified by the use of a single blocking vane. The circuit network for the destination lamps of Fig. 4 will be readily understood by an inspection of the drawing.

Figure 5:
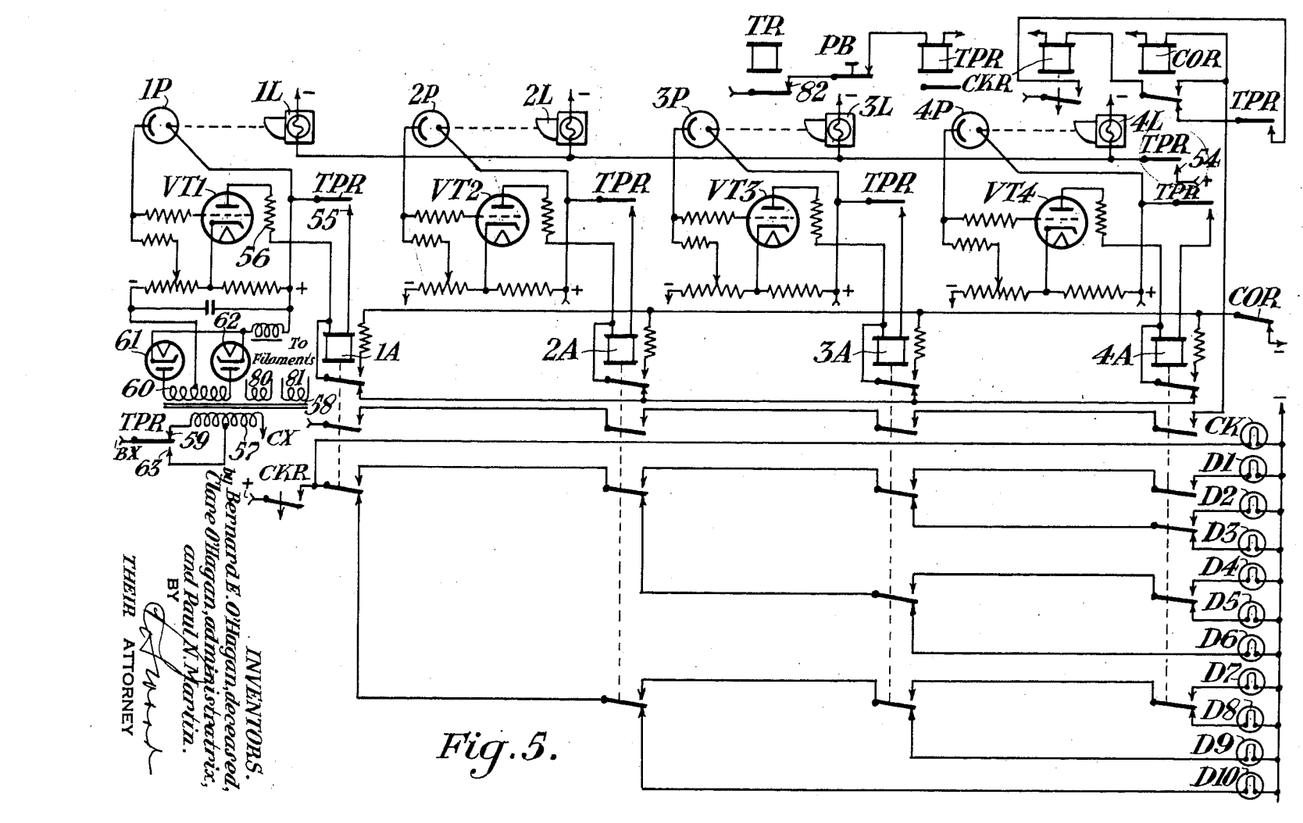

In Fig. 5, the wayside apparatus and circuits are similar to those of Fig. 4, except to be approach controlled. Track repeater relay TPR of Fig. 5 is energized by an obvious circuit including a normally closed push button PB located in the tower and front contact 82 of the track relay TR of the approach section so that relay TPR is released in response to a train approaching the tower or when the tower operator actuates the push button. With repeater relay TPR released closing back contact 54, the circuit for the lamps of the several lamp units is closed and the light beams are radiated across the tracks to the associated phototube units. The repeater relay TPR when released completes an anode circuit for etach of the amplifier tubes. For example, the anode circuit for the amplifier tube VT1 is completed from the positive terminal of the voltage divider through back contact 55 of relay TPR, winding of relay 1A, resistor 56 and the anode and cathode tube space of the tube to the mid terminal of the voltage divider.

In Fig. 5, power for the phototubes and the amplifier tubes is derived from an alternating current source through rectifier tubes. Normally, the full primary winding 57 of a transformer 58 is connected to the BX and CX terminals of the alternating current source through front contact 59 of repeater relay TPR, and a secondary winding 60 of the transformer 58 is connected across the different voltage dividers for the amplifier tubes through rectifier tubes 61 and 62. Also secondary windings 80 and 81 are connected to the filaments of the various tubes. The parts are so proportioned that the turn ratio of transformer 58 is such that when the full primary winding 57 is used the tubes are only in a semi-active condition. When relay TPR is released closing back contact 63, the turn ratio of the transformer 58 is increased so that the several tubes are brought up to an active condition. The check relays COR and CKR of Fig. 5 are governed in a manner similar to those of Fig. 4. The pick-up circuit for relay CKR includes a front contact of relay COR instead of the front contact of relay TPR as in Fig. 4. This change is required since TPR is released prior to the energization of relay CKR, and also affords a check on the proper operation of relay COR. Also, the control relays selectively govern tower indicator lamps, the same as in Fig. 4.

Normally, that is, when no train is approaching, the lamp units of Fig. 5 are dark and the phototube units and the amplifier tubes are in a semi-active condition. With the track repeater relay TPR released in response to a train entering the approach section, the lamp units are illuminated and the several tubes are brought to an active condition. The control relays are all energized and are then released selectively according to the train destination marker means, with the result that the corresponding control relays are released to establish a corresponding circuit for the respective indication lamps in the tower. It is to be pointed out that the tower operator can bring the apparatus to an active condition through the operation of the push button PB.

Figure 6:
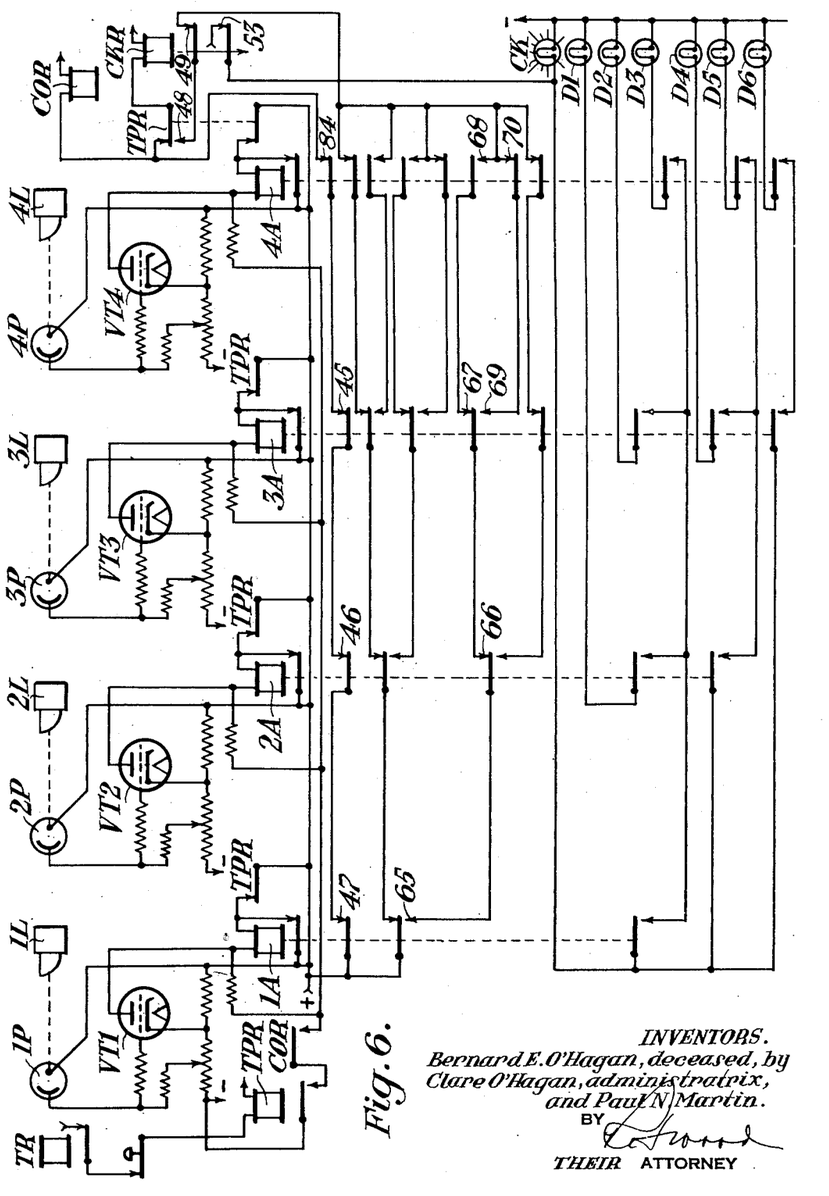

In Fig. 6 there is disclosed apparatus to provide protection against false indications when a definite combination of blocking vanes is used for each destination. The circuits shown in Fig. 6 are based on four blocking vanes being used in combinations of two and the circuits check that at least two and no more of the control relays are actuated for each destination indication. The circuits are similar to those of Fig. 4 except the circuits for the check relay CKR and for the indication lamps. The stick circuit for the check relay CKR includes a network having alternative paths completed through contacts of the control relays with each path completed when and only when the two corresponding control relays of the combination are released. For example, when blocking vanes are used at positions 1 and 4 so that relays 1A and 4A are released, the stick circuit path for the check relay CKR includes the positive terminal of the power source, back contact 65 of relay 1A, front contact 66 of relay 2A, front contact 67 of relay 3A, back contact 68 of relay 4A, front contact 49 of relay CKR and back contact 48 of relay TPR. Again, if blocking vanes are used at positions 1 and 3, the train destination is reflected by the combination of control relays 1A and 3A, causing indication lamp D2 to be lighted, and the stick circuit for the check relay CKR is completed through back contact 65 of relay 1A, front contact 66 of relay 2A, back contact 69 of relay 3A, and front contact 70 of the relay 4A. Similarly, each combination of two control relays to reflect a destination of a train is checked by the completion of the stick circuit for the check relay CKR. The check relay CKR when energized completes at its front contact 53 the supply to the circuit network for the destination lamps. Thus if the proper combination of control relays is actuated, a corresponding destination lamp will be selected.

Figure 7A:
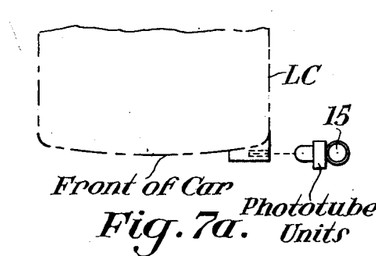
Figs. 7a and 7b are top and front views, respectively, showing another form of train identification means embodying the invention.
Figure 7B:
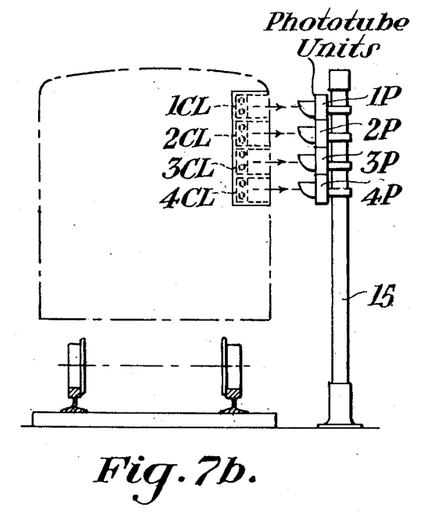

In place of the blocking vanes for train marker destination, train marker means using light units on the train to cooperate with wayside phototubes can be used, as shown in Figs. 7a and 7b. A set of four phototubes is fixed on a mast 15 at a preselected intermediate point of the approach section, the same as in Fig. 2b. Each train is provided with a matching set of light units, there being four such train carried light units identified by the reference characters 1CL, 2CL, 3CL and 4CL. These light units are mounted on a train preferably at the front end and disposed to direct their light beams at right angles to the track rails and the units are placed at different heights above the top rails so that the beam of each unit is directed into an associated phototube unit. A preselected combination of the light units would be illuminated to correspond to the destination of the train and the remaining units left dark. Thus as the front of the train passes the location of the wayside phototube units, light beams from corresponding lighted units on the train fall upon the phototubes and render each such tube conductive. Each conductive phototube would correspondingly control the associated amplifier tube and control relay so that the control relay actuated would correspond to the lighted train carried unit. The control relays would be used in turn to selectively govern train destination indication lamps as explained hereinbefore.

In this form of train destination markers, the loading of the car and the rocking of the car would tend to change the height of each light beam above the rails. To assure proper operation, there is provided a wide light beam. Such wide beam would be effected through reflectors or other means, and preferably a double lamp and reflector unit is provided. Looking at Fig. 7c, the light unit 1CL, for example, includes two lamps and reflector sections 71 and 72. The upper section 71 is arranged for its beam to have a spread indicated by the lines 73 and 74 and the lower section is arranged for its beam to have a spread indicated by the lines 75 and 76. The spread of the two beams overlap and the two beams would have a spread sufficient to take care of different loaded conditions and rolling of the car but would not be great enough for the beam of one unit to impinge upon the phototube of an adjacent phototube unit.

Figure 8A:
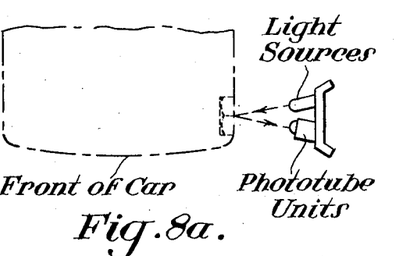
Figs. 8a and 8b are top and end views, respectively, showing still another form of train identification means embodying the invention.
Figure 8B:
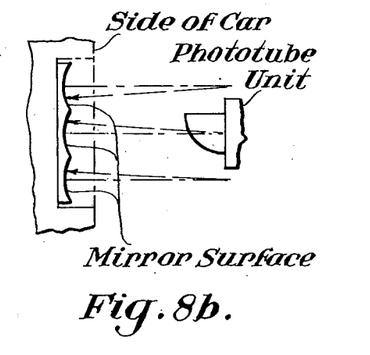

Figs. 8a and 8b show a train destination marker means where each wayside phototube unit is provided with its own stationary light source and mirrors are provided on the train, there being an individual mirror for each wayside unit. Preferably each mirror surface would be cylindrical with its axis horizontal parallel to the rail. In order to take care of variations in height and rocking of the car, the mirror surface for each phototube unit would be made in several cylindrical sections, each section having a radius approximately equal to the distance from the mirror surface to the phototube. The center of the middle section would be at the normal height of the phototube unit, and the centers of the upper and lower sections of the mirror would be placed above and below the phototube unit, as illustrated in Fig. 8b.

In train marker destination schemes so far described, visible light beams have been considered, but it is apparent that infrared beams, such as would be obtained by putting a filter over the light source, can be used.

Figure 9A:
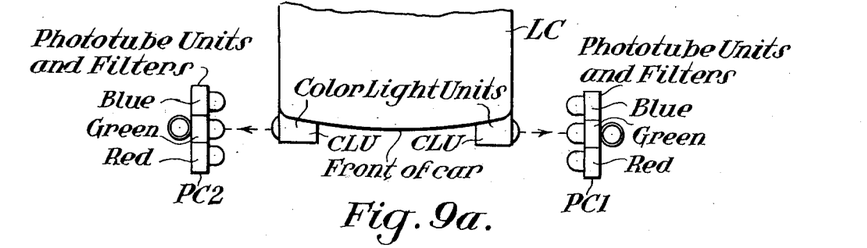
Figs. 9a and 9b are top and front views, respectively, showing a form of train identification means using color lights and which also embodies the invention.
Figure 9B:
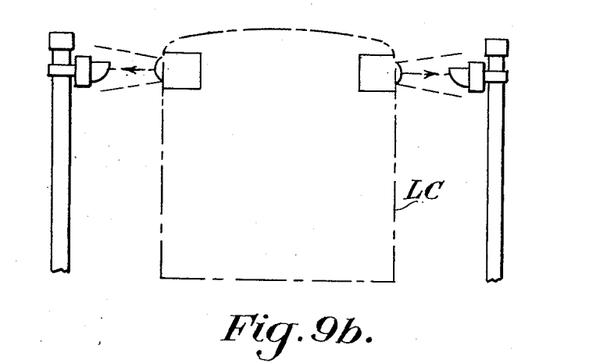

Furthermore, train marker means using color selection in the light source as well as position to obtain various train destinations is disclosed in Figs. 9a and 9b. Two color light units CLU are located at the front end of a train, each such unit being adapted to display a red, a green and a blue light, and to direct such light beams outwardly at right angles to the rails. Two wayside phototube units PC1 and PC2 are mounted on masts on opposite sides of the track directly opposite each other at a location along the approaching track section. The phototube units PC1 and PC2 include three elements in a horizontal row at a height corresponding to the train carried light unit, the three elements of each phototube unit being selectively responsive to red, green and blue light beams, respectively. Thus different combinations of color light at the front of the car would influence corresponding combinations of the elements at the wayside phototube units.

While radiant energy waves in the form of light waves have thus far been described for the apparatus, it is apparent that ultra high frequency electromagnetic waves with suitable receiving apparatus at the wayside can be used.

Figure 7C:
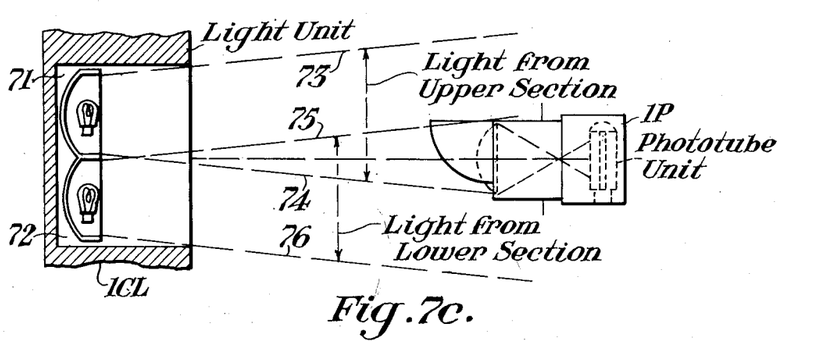
Fig. 7c is a detail sectional view of the identification means of Figs. 7a and 7b.
Figure 10:
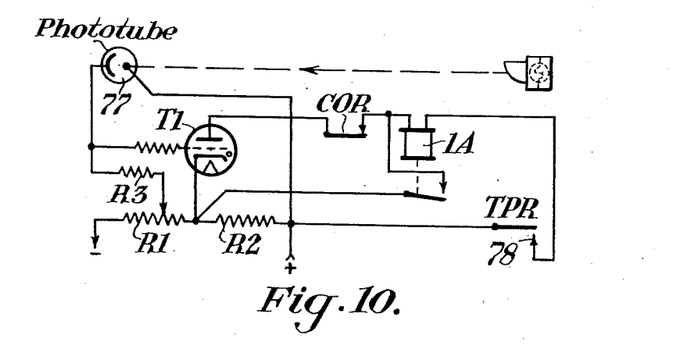
Fig. 10 is a diagrammatic view showing a modification of the wayside apparatus for use with the train identification means of Figs. 7, 8 and 9, and which modification also embodies the invention.

Fig. 10 discloses an amplifier tube and control relay arrangements that can be used with any of the train marker means of Figs. 7, 8 and 9. The phototube 77 is made conductive when the light beam falls upon it. The conductive current flowing through resistor R3 creates a voltage drop that drives the control electrode of the gas filled tube T1 in the positive direction, and tube T1 is fired and relay 1A is energized by the conduction current of tube T1, the anode circuit of tube T1 being completed through back contact 78 of the track repeater relay TPR when the train enters the approach track section. When control relay 1A is once picked up by the conduction current, the relay is retained energized through its stick circuit until the train passes out of the approach section and the repeater relay TPR is reenergized, opening back contact 78. It is apparent that control relay 1A of Fig. 10, together with other associated control relays can be used to govern train destination indication means in the manner set forth in Figs. 3, 4, 5 and 6.

Although there are herein shown and described several forms of railway train describers embodying the present invention, it is understood that various changes and modifications may be made therein within the scope of the appended claims without departing from the spirit and scope of the invention.

Having thus described the invention, there is claimed:

1. In a train describer system, the combination comprising, train carried light blocking vanes adapted to be attached on the front of a train at different positions above the track rails to form different route markings for the train by preselection of the positions at which such blocking vanes are attached, light units mounted at a wayside point passed by the train in moving to any one of a plurality of different routes, there being a light unit for each position at which said light blocking vanes can be attached, each said light unit disposed to direct a light beam across the track for the beams to be intercepted according to the positions at which the vanes are attached, phototube units one for each light unit and mounted directly across the track opposite the light units and each disposed to receive the beam of the respective light unit, and wayside apparatus including route indication means connected to said phototube units to display a route indication according to the intercepting of the light beams by the light blocking vanes.

2. In a train describer system, the combination comprising, train carried light blocking vanes adapted to extend in front of the train at different heights above the track rails, said vanes disposed to be arranged in different combinations with a preselected combination for each route to which the train may be dispatched, a light transmitting means mounted at a point in the approach to said routes, said light transmitting means disposed to direct a plurality of light beams at right angles across the track one at each height of said vanes for the vanes to intercept the beams according to the route combination of the vanes, light responsive means mounted at said point directly opposite said light transmitting means to be influenced by said light beams, and wayside apparatus including a route indicator connected to said light responsive means selectively controlled to display a route indication according to the light beams intercepted by the route combination of said blocking vanes.

3. In a train describer system, the combination comprising, train carried light blocking vanes adapted to extend in front of the train at different heights above the track rails, said vanes adaptable of being differently positioned to describe by their positions the particular destination of the train, light emitting means located along the trackway of the train and disposed to project a plurality of light beams across the track one at each height said vanes can be positioned, phototube units located across the track from said light emitting means with an individual unit to receive each of said light beams, control relays one governed by each of said phototube units to be operated to a first or a second position according as the phototube unit is or is not illuminated by the respective light beam, and indication means having an individual indicator for each of said routes and selectively controlled by said control relays to display the indicator corresponding to the route marking of said light blocking vanes.

4. In a train describer system, the combination comprising, a train carried light blocking vane adapted to be attached to the train to extend in front of the train, said train adapted for said vane to be attached at any one of a plurality of different heights above the rails to describe by its position the destination of the train, light emitting means mounted at a wayside point which the train passes in moving to its destination and disposed to direct a plurality of light beams across the track one at each height at which said vane can be mounted for the vane to intercept a beam according to its position, phototube units one for each said light beam and mounted across the track from said light emitting means for each phototube unit to receive its respective light beam, and control means including an individual indicator for each of said routes connected to said phototube units to display the route indication corresponding to the light beam intercepted by said vane.

5. In a train describer system, the combination comprising, a train carried light blocking vane adapted to be attached to the train to extend in front of the train, said train adapted for said vane to be attached at any one of a plurality of different heights above the rails to describe by its position the destination of the train, light emitting means mounted at a wayside point which the train passes in moving to its destination and disposed to direct a plurality of light beams across the track one at each height at which said vane can be attached to the train, phototube units one for each said light beam and mounted across the track from said light-emitting means for each phototube unit to be in the path of the respective light beam, control means including an amplifying tube and a control relay associated with each said phototube unit, each phototube unit being connected to a control electrode of the associated amplifying tube to effect a first or a second bias voltage according as the associated light beam is or is not intercepted, each said control relay interposed in the anode circuit of the associated amplifying tube to be operated to either a first or a second position according as said first or second bias voltage is applied to the amplifying tube, a stick circuit arrangement for each said control relay to retain the control relay at its first position subsequent to a change to the first bias voltage due to interception of the light beam of the associated phototube unit, a check relay energized over a circuit including in series a contact of each of said control relays and which contact is closed when said control relay is in said second position, and said check relay having a back contact interposed in the stick circuit arrangement of each said control relay to prevent operation of a control relay by interception of the associated light beam by the train body subsequent to said vane intercepting a light beam.

6. In a train describer system, the combination comprising, train carried light blocking vanes adapted to be attached to the train to extend in front of the train, said train adapted for the vanes to be attached at several different heights above the rails, said vanes attached in combinations of two vanes to describe by the different positions of the vanes any one of several different destinations for the train, light emitting means mounted at a wayside point which the train passes in moving to its destination and disposed to direct a plurality of light beams across the track one at each height at which said vanes can be attached to the train, phototube units one for each said light beam and mounted across the track from said light emitting means for each phototube unit to be in the path of the respective light beam, control means including an amplifying tube and a control relay associated with each said phototube unit, each phototube unit being connected to a control electrode of the associated amplifying tube to effect a first or a second bias voltage according as the associated light beam is or is not intercepted, each said control relay interposed in the anode circuit of the associated amplifying tube to be operated to a first or a second position according as said first or second bias voltage is applied to the amplifying tube, a stick circuit for each said control relay to retain the control relay at its first position subsequent to a change to the first bias voltage due to interception of the light beam of the associated phototube unit, a check relay energized over a circuit network including in series a plurality of circuit paths each of which paths includes in multiple second position contacts of a combination of two control relays, and said check relay having a front contact interposed in each of said anode circuits to prevent operation of a control relay by interception of the associated light beam by the train body.

7. In a train describer system, the combination comprising, light transmitting means located at a wayside point which a train passes in moving to any one of a plurality of different destinations and disposed to direct several light beams across the track at different heights above the track rails, phototube units one for each said light beam and located across the track from said light transmitting means for each phototube unit to be in the path of the respective light beam, train carried means to intercept different combinations of two of said beams prior to the beams being intercepted by the train body, each said combination identifying a different destination for the train, a control unit including an amplifying tube and a control relay associated with each said phototube unit, each phototube unit and control relay connected to a control electrode and an anode respectively of the associated amplifying tube in such a manner as to energize or deenergize the control relay according as the associated light beam is not or is intercepted, a stick circuit for each said control relay and each of which stick circuits includes a first and a second path with the first path including the anode of the associated tube whereby the relay is deenergized subsequent to the interception of the associated light beam, a first check relay energized over a circuit including in series a front contact of each control relay and having a back contact interposed in the second path of the stick circuit of each of said control relays to complete the stick circuit around the associated amplifier tube, a second check relay normally energized in multiple with said first check relay and provided with another energizing circuit network closed when and only when the two control relays of each said combination are released, and route indication means controlled jointly by said second check relay and said combination of the control relays.

8. In a train describer system, the combination comprising, a car carried light blocking vane adapted to be attached to the car to extend in front of the car, said car adapted for said vane to be attached at any one of a plurality of different heights above the rails to describe by its position the destination of the car, light emitting means mounted at a point which the car passes in moving to its destination and disposed to direct a plurality of light beams across the track one at each height at which said vane can be attached to the car, phototube units one for each said light beam mounted across the track from said light emitting means for each phototube unit to be in the path of the respective light beam, control means including an amplifying tube and a control relay associated with each said phototube unit, each phototube unit connected to a control electrode of the associated amplifying tube to effect a first or a second bias voltage according as the light beam is or is not intercepted, a check relay energized over a circuit including in series a contact of each of said control relays, a pick-up circuit for each control relay including a resetting contact and the anode-cathode space of the respective amplifying tube, a first stick circuit for each control relay including a front contact of the control relay and the anode-cathode space of the respective amplifying tube to maintain the control relay energized when the associated light beam is not intercepted, and a second stick circuit for each control relay including a back contact of said check relay to retain the control relay energized when the associated light beam is intercepted by the car body.

CLARE O'HAGAN.
*Administratrix of the Estate of Bernard E. O'Hagan, Deceased.*

PAUL N. MARTIN.

REFERENCES CITED

The following references are of record in the file of this patent:

UNITED STATES PATENTS

| Number | Name | Date |
| --- | --- | --- |
| 847,157 | Brown et al. | Mar. 12, 1907 |
| 1,840,014 | Bergstein | Jan. 5, 1932 |
| 2,089,835 | Logan | Aug. 10, 1937 |
| 2,122,358 | Preston | June 28, 1938 |